United States Patent
Schuster

(10) Patent No.: US 7,076,694 B2
(45) Date of Patent: Jul. 11, 2006

(54) METHOD AND DEVICE FOR ESTABLISHING THE NETWORK TOPOLOGY OF A BUS SYSTEM

(75) Inventor: Armin Schuster, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 642 days.

(21) Appl. No.: 10/381,783

(22) PCT Filed: Sep. 17, 2001

(86) PCT No.: PCT/DE01/03572

§ 371 (c)(1),
(2), (4) Date: Mar. 28, 2003

(87) PCT Pub. No.: WO02/28061

PCT Pub. Date: Apr. 4, 2002

(65) Prior Publication Data
US 2004/0098514 A1   May 20, 2004

(30) Foreign Application Priority Data
Sep. 29, 2000   (DE)   ................ 100 48 745

(51) Int. Cl.
*G06F 11/00* (2006.01)
(52) U.S. Cl. .............. 714/43; 714/715; 370/257
(58) Field of Classification Search ............ 714/43, 714/715; 370/257
See application file for complete search history.

(56) References Cited

U.S. PATENT DOCUMENTS

| | | | |
|---|---|---|---|
| 3,950,622 A * | 4/1976 | Taylor | 370/243 |
| 6,125,458 A * | 9/2000 | Devan et al. | 714/43 |
| 6,928,592 B1 * | 8/2005 | Barrett | 714/715 |
| 2002/0180954 A1 * | 12/2002 | Qian et al. | 356/73.1 |
| 2004/0091032 A1 * | 5/2004 | Duchi et al. | 375/224 |

FOREIGN PATENT DOCUMENTS

DE      197 26 539      1/1999

OTHER PUBLICATIONS

Knutz, "Echomesstechnik Macht Lan Transparent" NTZ Nachrichtentechnische Zietschrift, 47 pp. 242-246 (1994).

\* cited by examiner

*Primary Examiner*—Bryce P. Bonzo
(74) *Attorney, Agent, or Firm*—Staas & Halsey LLP

(57) ABSTRACT

To determine the network topology of a bus system having a number of bus users positioned on bus segments of a bus line interconnected by at least one diagnosis repeater, an initiating measuring telegram is first sent to each bus user. This telegram is answered by the diagnosis repeater with a data telegram having a segment code and by other bus users with a response telegram. The diagnosis repeater then sends a measuring signal to each responding bus user, which reflects the signal. The distance of the responding bus user from the diagnosis repeater is determined from the time interval between the sending of the measuring signal and the arrival of the reflection signal.

10 Claims, 4 Drawing Sheets

| | | TF | SF | BF$_T$ | | | | EF | TF | BF$_R$ | | | |
|---|---|---|---|---|---|---|---|---|---|---|---|---|---|
| T$_n$ | Status | | | P$_G$ | B̄$_1$ | B̄$_2$ | B̄$_3$ | i$_n$ | | P$_G$ | B$_1$ | B$_2$ | B$_3$ |
| 0 | not found | | | | | | | - | - | | | | |
| 1 | not found | | | | | | | - | - | | | | |
| 2 | not found | | | | | | | - | - | | | | |
| 3 | not found | | | | X | | | - | yes | | | X | |
| 4 | not found | | | | | | | - | - | | | | |
| ... | not found | | | | | | | - | - | | | | |
| 11 | found | | | X | X | X | X | 0 m | yes | | | | |
| 12 | not found | | | | | | | - | - | | | | |
| 13 | not found | | | | | | | - | - | | | | |
| ... | not found | | | | | | | - | - | | | | |
| 21 | found | | | | | X | | ...m | no | | | | |
| 22 | found | | | | | X | | ...m | yes | | | X | |
| 23 | found | | | | | X | | ...m | no | | | | |
| 24 | found | | | | | | X | ...m | yes | | | X | |
| 25 | not found | | | | | | | - | - | | | | |
| ... | not found | | | | | | | - | - | | | | |
| 31 | not found | | | | | | | - | - | | | | |
| 32 | not found | | | | | | | - | - | | | | |
| 33 | not found | | | | | | | - | - | | | | |
| 34 | not found | | | | | | | - | - | | | | |
| ... | not found | | | | | | | - | - | | | | |
| 41 | not found | | | | | | | - | - | | | | |
| 42 | not found | | | | | | | - | - | | | | |
| 43 | not found | | | | | | | - | - | | | | |
| ... | not found | | | | | | | - | - | | | | |
| 90 | not found | | | X | | | | - | yes | | | X | |
| 91 | not found | | | | | | | - | - | | | | |
| ... | not found | | | | | | | - | - | | | | |
| 126 | not found | | | | | | | - | - | | | | |

Fig. 4

METHOD AND DEVICE FOR ESTABLISHING THE NETWORK TOPOLOGY OF A BUS SYSTEM

CROSS REFERENCE TO RELATED APPLICATIONS

This application is based on and hereby claims priority to German Application No. 100 48 745.9 filed on Sep. 29, 2000, the contents of which are hereby incorporated by reference.

BACKGROUND OF THE INVENTION

1. Field of Invention

The invention relates to a method for determining the network topology of a bus system having a number of bus subscribers, which are arranged on mutually connected bus segments of a bus line. It also relates to an apparatus for carrying out the method.

2. Description of the Related Art

A bus system or field bus within a complex network having a number of bus segments has a large number of bus subscribers in the form of field appliances, such as sensors, actuators, programmable logic controllers and control stations. By way of example, the so-called PROFIBUS DP network normally has up to 127 bus subscribers, to which subscriber addresses from 0 to 126 may be allocated. In this case, up to 32 network components can be connected as bus subscribers to one bus segment, as a section of a bus line.

The line length of an individual bus segment is limited, depending on the so-called baud rate. This indicates the data rate which can be transmitted over that bus segment. With a normal data rate of 12 M baud=$12 \cdot 10^6$ bits/s, it follows that one bit is equal to a length of 83 ns. Within the network, the individual bus segments are connected by line drivers or so-called repeaters, which are used to provide branches in the field bus or network. In this case, the network topology of the bus system should be known, and is governed by the arrangement, that is to say by the sequence and the relative distance between the bus subscribers on the individual bus segments (bus segment topology), and by the connection of the bus segments to one another.

SUMMARY OF THE INVENTION

The invention is thus based on the object of specifying a particularly suitable method for automatically determining the network topology of even a complex bus system. Furthermore, an apparatus which is particularly suitable for carrying out the method will be specified.

The invention is in this case based on the knowledge that, in the case of a bus subscriber with a transmitter which can be switched off, the transmitter/receiver combination when the transmitter is deactivated on the one hand has such a high impedance that it does not cause any interference with the transmission on the bus line, but on the other hand has a low impedance when the transmitter is activated. In this case, a transmitting bus subscriber reduces its internal impedance from infinity ($\infty$) to about 40 $\Omega$, which results in a local change in the characteristic impedance of the bus line of the respective bus segment to which this transmitting bus subscriber is connected. If a measurement pulse or signal is now passed to the bus line during the transmission of a bus subscriber, then this pulse or this signal is reflected from the transmitting bus subscriber. This reflection can in turn be detected using the principle of reflection measurement. A method which operates on the principle of reflection measurement for localization of a short circuit or of a cable discontinuity in a two-wire bus system is disclosed, for example, in DE 197 26 539 A1.

In order to carry out the method according to the invention, repeaters which have an additional function added to them are used in the bus system and, in the following text, these are referred to as diagnosis repeaters. In addition to the repeater function for connection of individual bus segments, these have a diagnosis function which is based on the principle of reflection measurement. If diagnosis repeaters such as these are used instead of repeaters when designing a network with a number of bus segments, in particular when designing a PROFIBUS DP network, then no additional network components are required either for determining the topology or for line diagnosis, which can likewise be carried out by the diagnosis repeaters.

First of all, for topology determination, a request signal in the form of an initiating measurement message to send a response signal or message is transmitted via the bus line to each bus subscriber. During the transmission of the response message, a measurement signal is sent via the bus line, and is reflected by the responding bus subscriber.

Since a repeater as well as the diagnosis repeater which is used in its place is a passive bus subscriber (slave), it cannot cause any other bus subscriber to transmit. This object is therefore carried out by a master, which already exists in a bus system such as this, or by some other active bus subscriber, which then has an appropriate initiator function (measurement initiator) added to it, so that, once again, no additional network component is required. The measurement initiator thus requests the or each bus subscriber to transmit while the diagnosis repeater is transmitting a measurement pulse to the responding bus subscriber, and the bus subscriber reflects this measurement pulse.

In this application of the principle of reflection measurement, the time interval between the transmission of the measurement signal and the arrival of the reflection signal from the responding bus subscriber is used to determine its distance from the diagnosis repeater and hence its relative position within the bus segment. In this case, a further diagnosis repeater which is provided on this bus segment can be designed such that it is modeled as a slave and has its own subscriber address.

The diagnosis function is also used for line diagnosis, that is to say to determine the fault location and the fault cause of line faults which occur along the bus line, such as a short circuit, a cable discontinuity or an incorrectly connected terminating impedance. Following the automatic determination of the network topology, the fault location can then be indicated relative to the existing bus subscribers, for example in the form of "fault between subscribers Tx and Ty".

This application of the principle of reflection measurement makes use of the knowledge that a line fault or a disturbance point results in a local change to the characteristic impedance along a bus line, thus reflecting a pulse or a signal. For example, the characteristic impedance changes to a low impedance in the case of a short circuit, and to a high impedance in the case of a discontinuity. The distance to a line fault or to a disturbance point can be determined from the time interval between the transmission of a measurement pulse or of a measurement signal and the arrival of the reflection. Furthermore, statements relating to the cause of the line fault can be derived from the polarity of the reflection.

In one advantageous refinement, the distance to the or to each bus subscriber is stored by the diagnosis repeater in a topology table. The topology table in each diagnosis repeater which is provided in the bus system or network has a number of table fields, which are associated with the subscriber addresses of all the bus subscribers. In this case, in particular, a status field is provided for indicating the identification of the bus subscriber. A subscriber-specific bus segment field is also provided, containing an entry for the bus segments which are connected to that diagnosis repeater. Furthermore, a distance field is provided, in which the distance determined to the respective bus subscriber found is entered. The topology table also includes a type field for identifying an adjacent diagnosis repeater or another bus subscriber. Furthermore, a repeater-specific bus segment field is provided, which is used for identifying the respective bus segment to which the determined adjacent diagnosis repeater is connected.

If a disturbance point or a line fault along the bus line is determined during a process for determining disturbance points or line diagnosis which is likewise based, in an expedient development, on the principle of reflection measurement, the topology table is advantageously used to determine the bus subscribers between which the disturbance point or line fault is located.

This method and this apparatus for automatic topology determination make it possible to find out or determine the distance between each bus subscriber and a defined bus subscriber in the same bus segment, as well as their connection to one another, in a simple and reliable manner. In particular and in addition, in the event of a topology change, that is to say a change and/or an upgrade to the configuration of bus subscribers or bus segments, it is reliably possible to exactly determine the sequence of and the relative distance between the bus subscribers within a bus segment, and their arrangement within the network, with particularly little effort.

The method according to the invention and the apparatus according to the invention are thus particularly suitable for field bus systems, in particular for the so-called PROFIBUS DP network.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 4 is a topology table of a diagnosis repeater in the bus system shown in FIG. 3.

DETAILED DESCRIPTION OF THE PREFERRED EMBODIMENT

Reference will now be made in detail to the preferred embodiments of the present invention, examples of which are illustrated in the accompanying drawings, wherein like reference symbols refer to like elements throughout.

Figures 1, 2:
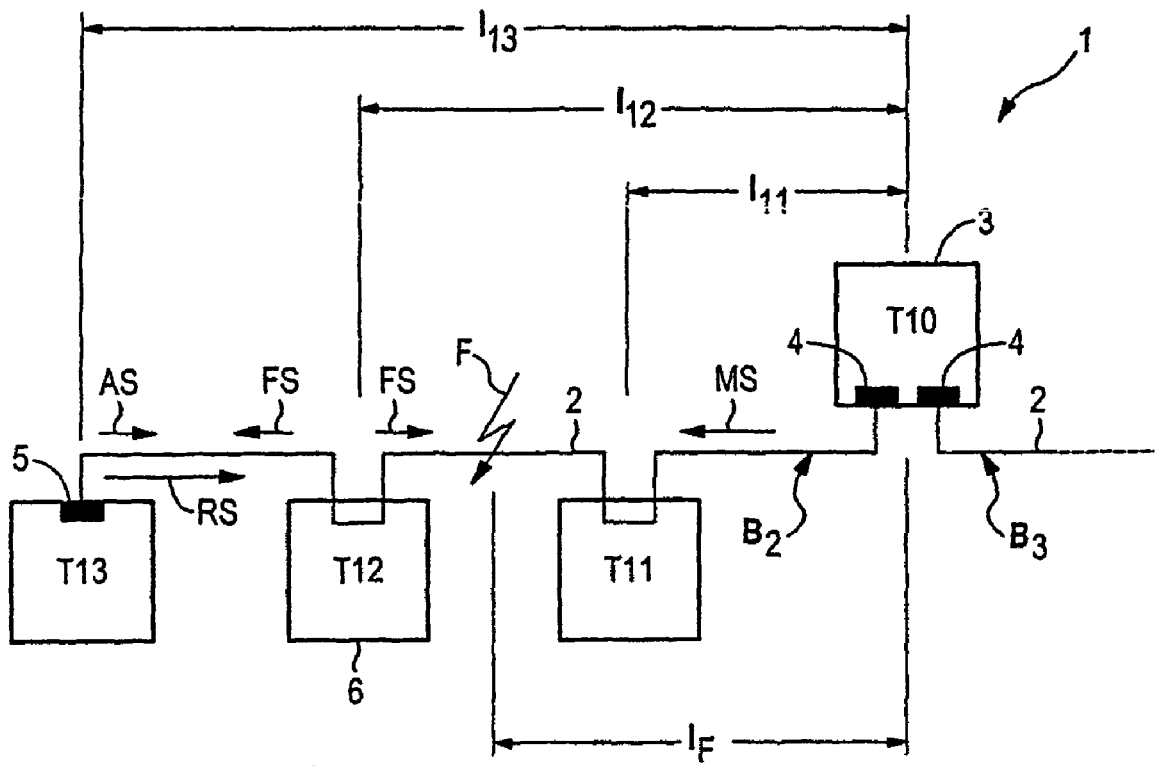
FIG. 1 is a block diagram of a simple bus system with a measurement initiator and a diagnosis repeater, which connects two bus segments, for topology determination.
FIG. 2 is a topology table which is stored in the diagnosis repeater shown in FIG. 1.

FIG. 1 shows a detail of a relatively complex bus system 1, in particular of a PROFIBUS DP network. In the case of a PROFIBUS DP network, which may have a large number of bus segments Bn, a total of 127 bus subscribers with the subscriber addresses T0 to T126 are provided within the bus system 1. One bus segment Bn is in this case a piece or section of line of a bus line 2 to which up to 32 network components or subscribers Tn may be connected. The line length of the respective bus segment Bn is in this case limited—as a function of the baud rate used for data transmission.

Figure 3:
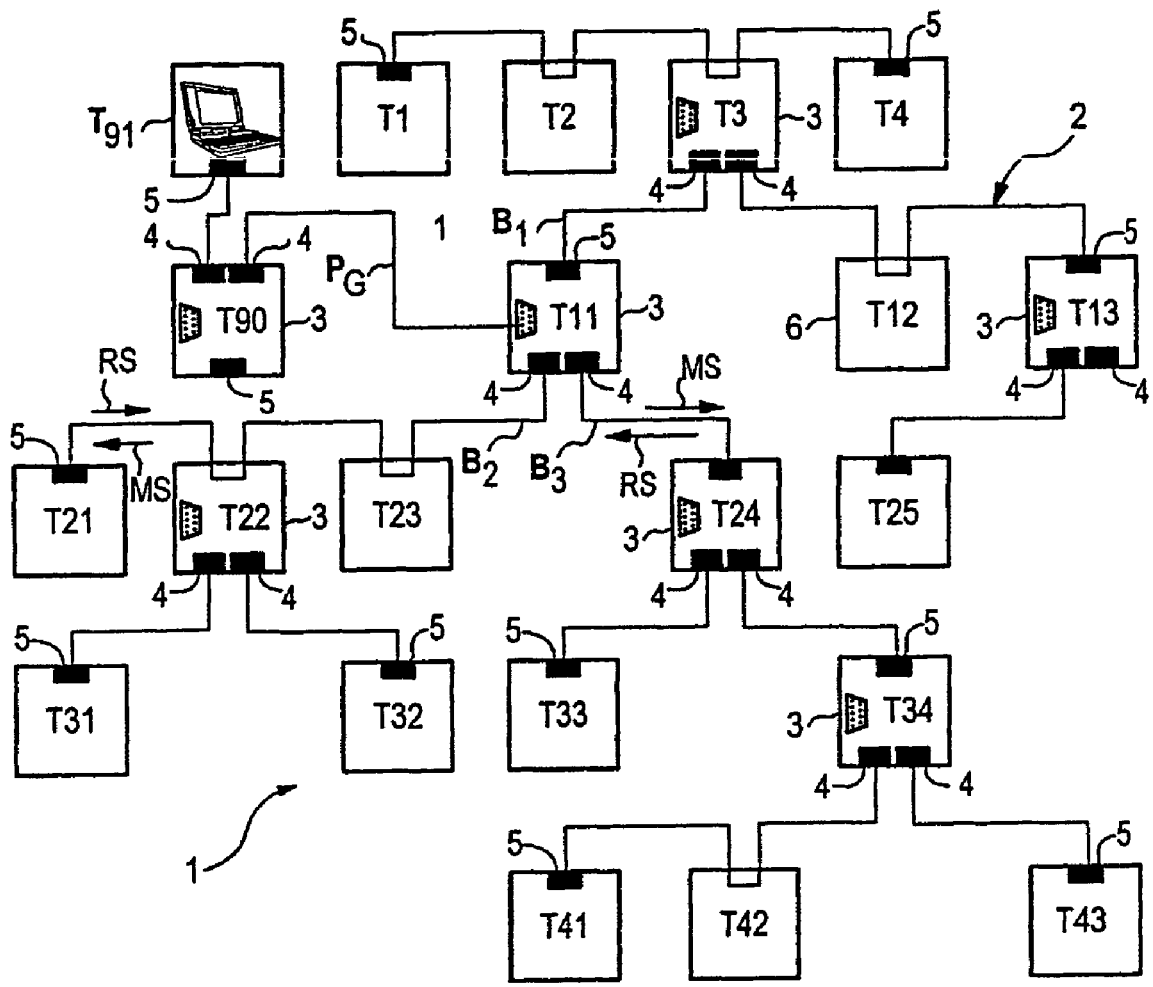
FIG. 3 is a block diagram of a complex bus system with a number of diagnosis repeaters.

As is indicated in FIG. 1 and is illustrated in FIG. 3, individual bus segments Bn are connected by line drivers or line amplifiers—so-called repeaters—with these repeaters being used to provide branch in the network. A repeater such as this is now in the form of a diagnosis repeater 3, which, in addition to the repeater function for the bus segments B1, B2, has a measurement circuit 4 for reflection measurement.

In the exemplary embodiment, the diagnosis repeater 3 has two measurement circuits or devices 4 with terminating impedances (which are not shown). The measurement devices 4 are connected to the bus line 2 and are each associated with one bus segment B2 or B3. Each bus segment has a number of bus subscribers Tn which are connected to the respective bus line 2, with only the bus segment B2 with bus subscribers T11 to T13 being used in the exemplary embodiment. A terminating impedance 5 is connected to the bus subscriber T13. The bus segment B2 has a measurement initiator 6 as an active bus subscriber T12, whereas the diagnosis repeater 3 is a passive bus subscriber T10.

The topology of the bus system 1 is determined by a reflection measurement. This is done by making use of the fact that a transmitting bus subscriber Tn on the bus segment B2 or on the bus line 2 behaves in the same way as a disturbance point F that is symbolized by the arrow. This is because a transmitting bus subscriber Tn reduces its internal impedance from infinity to about 40 Ω when transmitting. If a measurement pulse is now applied to the bus line 2, then this measurement pulse is reflected by a transmitting bus subscriber Tn.

A bus subscriber Tn is caused to transmit by the measurement initiator 6 addressing it with a request signal FS, thus causing it to transmit. In the case of PROFIBUS, a measurement message in the form of a so-called SRD where DSAP=3FH without data (SRD measurement message) is provided for this purpose. If the addressed bus subscriber Tn behaves in accordance with the standard, then it responds with a response signal AS which, in the case of PROFIBUS, is a so-called RS (FC=x3H) or RS measurement message.

While a bus subscriber Tn responds to a request signal FS (SRD measurement message) with a response signal AS (SR measurement message), the diagnosis repeater 3 transmits a measurement pulse or a measurement signal MS which is reflected by the transmitting subscriber Tn. The measurement device 4 in the diagnosis repeater 3 uses the time period between the transmission of the measurement pulse MS and the arrival of the reflection, that is to say of a reflection signal RS from the responding bus subscriber Tn, to determine the relative position of this bus subscriber Tn on the bus line 2, and thus within the bus segment B2. In this case, the distance between the respective bus subscriber Tn and the diagnosis repeater 3 is determined from the delay time divided by twice the line or cable delay time.

The diagnosis repeater 3 stores the determined distances ln of the bus subscribers Tn in a topology table 7 as illustrated in FIG. 2. The topology table 7 contains all the possible bus subscribers Tn in the bus system 1 (subscriber field TF). The status (status field SF) and the position on the respective bus segment B2,3 (bus segment field BFT) as well as the distance ln from the diagnosis repeater 3 (distance field EF) are stored for all the bus subscribers Tn in the topology table 7. The status of a bus subscriber Tn which has not yet been measured is open, while measured bus subscribers Tn have the status "found" or "not found". The exemplary embodiment assumes that no bus subscribers Tn are attached to the bus segment B2, and that all the bus subscribers Tn on the bus segment B2 have been measured. The diagnosis repeater 3, as the bus subscriber T10, is located both on the bus segment B2 and on the bus segment B3, and its distance from itself is L10=0 m.

If, following the determination of the bus topology, the distance to a disturbance point, which is symbolized in FIG. 1 by the arrow F on the bus line 2 or the bus segment B2, is determined, then it is possible to use the topology table 7 to find out which bus subscribers Tn this disturbance point or the line fault F is located between. In the exemplary embodiment, the disturbance point F is located between the bus subscriber T11, whose distance from the diagnosis repeater 3 is l11=5 m, and the bus subscriber T12, that is to say the measurement initiator 6, whose distance from the diagnosis repeater 3 is l12=10 m. The exact distance lF between the disturbance point F and the diagnosis repeater 2 is likewise determined by the measurement device 4 and in this case once again preferably on the principle of reflection measurement.

In order to identify disturbance points or line faults F on the bus line 5, the diagnosis repeater 3 sends an initiating measurement signal to the bus line 2. This initiating measurement signal is reflected at the disturbance point F as a result of the change of the characteristic impedance of the bus line 2, and is detected by the measurement device 4 as a reflection or reflection signal. The distance lF between the disturbance point or the line fault F and the diagnosis repeater 3 is determined from the time difference between the start time of the measurement signal initiated by the diagnosis repeater 3 and the arrival of the reflection signal at the measurement device 4. For this purpose, the detected delay time is once again divided by twice the line or cable delay time which is, for example, 5 ns/m.

The initiating measurement signal is preferably a measurement message, that is to say a data message which forms the wanted signal. A passive reflection measurement which is carried out in this way has the major advantage over an active reflection measurement that the line diagnosis is free of any reactions, since no separate test signal or separate measurement pulse need be passed to the bus line 2 during operation of the bus. In fact, the actual wanted signal is used to detect line faults or disturbance points F.

Passive reflection measurement can thus be used not only for topology determination but also to identify and localize, in a manner free of reactions, disturbance points or line faults F, and hence for particularly effective line diagnosis, even during operation of the bus.

The integration of the measurement device 4, which is used for topology determination and preferably also for line diagnosis, in a repeater to whose function the diagnosis repeater 3 has been added in this way means that no additional or separate bus module is required within the bus system for this measurement function. The measurement initiator 6 is an active bus subscriber, expediently a master which already exists in such a bus system 1 and to which an appropriate initiator function has been added. There is thus also no need for a separate bus module for this purpose.

FIG. 3 shows a comparatively complex, networked bus system 1 with a number of diagnosis repeaters 3 and with a measurement initiator 6 which is once again addressed as a bus subscriber T12. Each of these diagnosis repeaters 3 in this bus system 1, which in the exemplary embodiment is in the form of a PROFIBUS DP network, connects a maximum of three bus segments Bn to one another. The diagnosis repeater 3, which is considered in more detail in the following text and is addressed as the bus subscriber T11, is also connected via its PG interface to the measurement circuit 4 of the diagnosis repeater 3, which is addressed as the bus subscriber T90. Its further measurement circuit 4 is connected to a programmer (PG), which is addressed as the bus subscriber T91.

A topology table 7', which is larger than the topology table 7 shown in FIG. 2 and in the exemplary embodiment is associated with the diagnosis repeater 3 that is addressed as the bus subscriber T11, has (in addition to the subscriber field TF and to the status field SF as well as in addition to the subscriber-specific bus segment field BFT and to the distance field EF) a type field TF for identifying the type of bus subscriber Tn, and a repeater-specific bus segment field BFR for identifying a segment-specific adjacent diagnosis repeater 3.

The entries in this enlarged topology table 7' were produced as a result of the automatic determination of the network topology by the diagnosis repeater 3, which is addressed as the bus subscriber T11 and is referred to in the following text as the diagnosis repeater T11. On the basis of a low-priority SRD measurement message (SRD at DSAP=63), which is transmitted by the measurement initiator 6 (which is addressed as the bus subscriber T12), to which the bus subscriber T3 which is connected to the bus segment B1 of the diagnosis repeater T11 responds with a data message DT ( FIG. 6), the diagnosis repeater T11 has identified this as such and labeled it appropriately in the type field TF. An entry in the repeater-specific bus segment field BFR of the topology table 7' furthermore identifies the corresponding bus segment B2, via which the diagnosis repeater 3, which is addressed as the bus subscriber T3 and is also referred to in the following text as the diagnosis repeater T3, is connected to the diagnosis repeater T11.

The status "not found" is stored for this bus subscriber T3 in the enlarged topology table 7', since the diagnosis repeater T11 does not have a measurement circuit 4 on this bus segment B1. The diagnosis repeater T11 can therefore not determine the distance to the diagnosis repeater T3. This distance ln is determined by the diagnosis repeater T3, since this has a measurement circuit 4 on this bus segment B1 or B2. The distance ln between these two diagnosis repeaters 3 is thus included in the enlarged topology table for the diagnosis repeater T3.

The low-priority SRD measurement message which is sent by the measurement initiator 6 results in the diagnosis repeater T11 being associated with the distance L11=0 m with itself, as well as the bus segments B1,2,3 which are connected through it and the PG interface and the status "found". In an analogous manner, the diagnosis repeaters 3 which are connected to the bus segments B2 and B3 of the diagnosis repeater T11 and are respectively addressed as the bus subscribers T22 and T24 lead to corresponding entries in the enlarged topology table 7' of the diagnosis repeater T11.

The two further bus subscribers T21 and T23 which are connected to the bus segment B2 of this diagnosis repeater T11 respond to the SRD measurement message which is sent by the measurement initiator 6 with an RS measurement message and are, in consequence, identified as bus subscribers Tn, which are not diagnosis repeaters 3. This is reflected in the type field TF of the respective topology table 7'. The diagnosis repeater 3 which is connected to the PG interface and is addressed as the bus subscriber T90 is admittedly once again identified as such, but is likewise given the status "not found", since the diagnosis repeater T11 once again has no measurement circuit 4 for it.

While the bus subscribers T21 to T23 and T24 which are connected to the bus segments B2 and B3 respond to the low-priority SRD measurement message which is transmitted by the measurement initiator 6 with an RS measurement message, the diagnosis repeater T11 once again sends a measurement signal MS to the bus subscribers T21 to T24, at which point they once again respond with a reflection signal RS. The respective measurement circuit 4 of the diagnosis repeater T11 once again uses the signal delay time between the transmission of the measurement signal MS and the arrival of the reflection signal RS to determine the distance L21 to L24 to the corresponding bus subscriber T21 to T24, and enters the result in the appropriate distance field EF in its topology table 7'.

Figure 5:
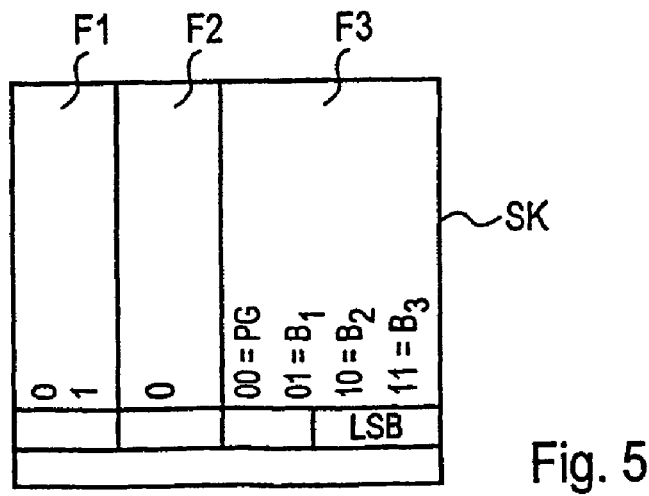
FIG. 5 is a data structure of a segment identifier for a data message.
Figure 6:
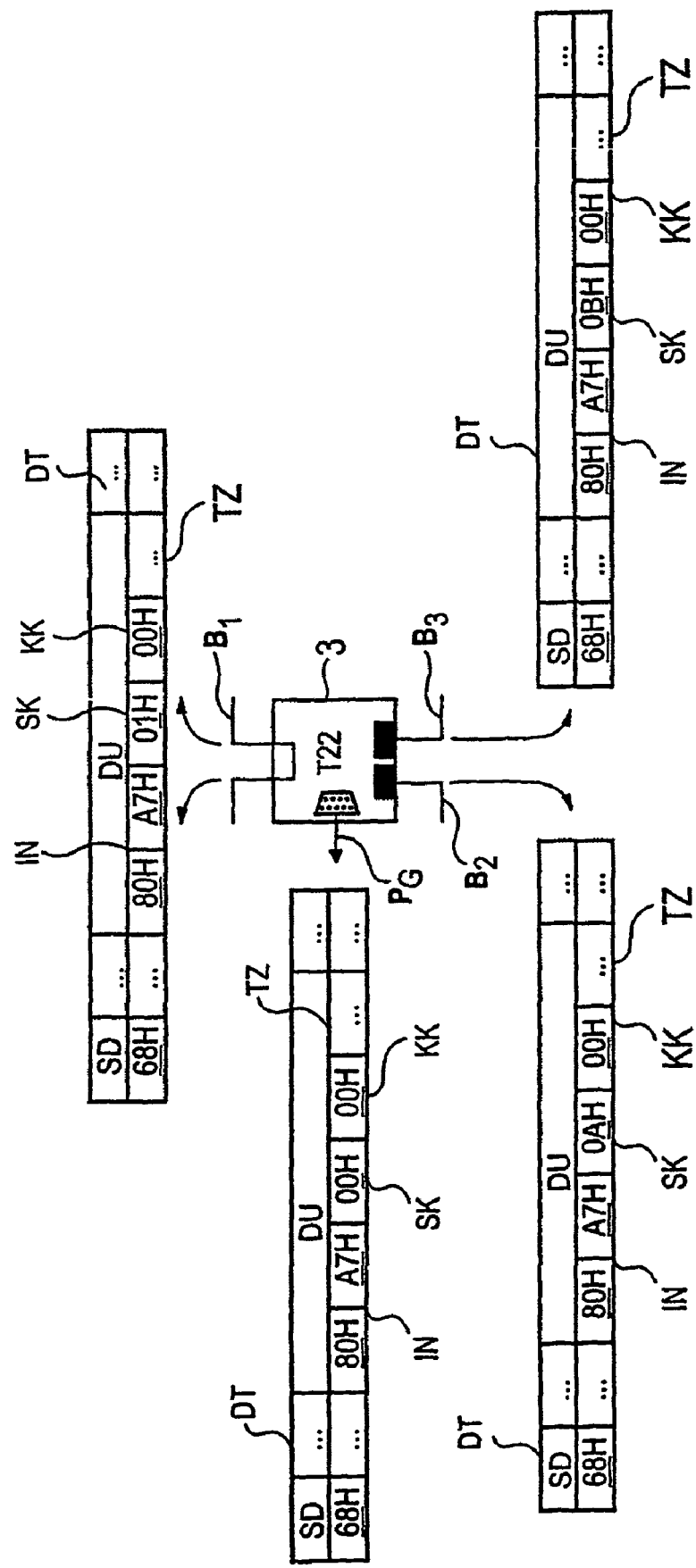
FIG. 6 is a block diagram with data structures of data messages which are sent on a segment-specific basis by a diagnosis repeater for topology identification.

While the other bus subscribers Tn respond to the low-priority SRD measurement message of the measurement initiator 6 with an RS measurement message, the or each diagnosis repeater 3 responds to it with a data message DT in addition to a segment identifier SK (8 bits) as shown in FIG. 5, this data message DT contains, as shown in FIG. 6, an identification number IN for the diagnosis repeater 3 (16 bits), a cascading identifier or cascading depth identifier KK (8 bits) and a topology updating counter TZ (16 bits).

The bus segment Bn to which the diagnosis repeater 3 has sent the data message DT can be read on the basis of the segment identifier SK shown in FIG. 5.

Furthermore, it is possible to read from this segment identifier SK whether a measurement circuit 4 for reflection measurement is connected to this bus segment Bn. For this purpose, a first segment field F1 is set to logic "0" when no measurement circuit 4 is connected to this bus segment Bn. Otherwise, this segment field F1 is set to logic "1". A further segment field F2 is reserved, and is set to logic "0". The respective bus segment Bn is identified in a third segment field F3, with the identifier "01", "10" or "11" being set in the case of the PG interface "00" and in the case of the bus segments B1,2,3.

The data message DT which is sent on a segment-specific basis by the diagnosis repeater 3 is illustrated in FIG. 6. This shows that each data message DT which is sent on a segment-specific basis initially contains the same identification number IN=80H A7H. The segment identifier in the data message which is sent via the bus segment B1 is set to SK=01H since, according to the exemplary embodiment shown in FIG. 3, a measurement circuit 4 of the diagnosis repeater T3 is located on this bus segment B1. The segment identifier in the data message which is sent via the PG interface is set to SK=00H, while this segment identifier in the data message which is sent via the bus segments B2 and B3 is set to SK=10=0AH or SK=11=0BH, respectively. The cascading identifier in each data message DT which is sent on a segment-specific basis is set to KK=00H.

This cascading identifier KK indicates the number of those diagnosis repeaters 3 which have passed on the data message DT of another diagnosis repeater 3. The diagnosis repeater 3 shown in FIG. 6 has transmitted the data message DT and thus uses KK=00H as the cascading depth identifier. Each diagnosis repeater 3 which passes on such a data message DT increments the cascading depth identifier, for example by one. This means that a diagnosis repeater 3 which receives this data message DT sets the identifier to, for example, KK=01H before it passes on this data message DT. This identifier KK can thus be used to encrypt a cascading depth of up to 128 diagnosis repeaters 3, although this is preferably limited to a smaller number of, for example, 9 or 10 diagnosis repeaters 3.

If the measurement initiator 6 sends a low-priority SRD measurement message via the bus line 2 within the bus system 1 or PROFIBUS DP network illustrated in FIG. 3 then, for example, the diagnosis repeater T3 responds with a corresponding segment-specific data message DT, which the diagnosis repeater T11 receives via its bus segment B1. The diagnosis repeater T11 passes this data message DT on via its bus segments B2 and B3, once it has incremented the cascading depth identifier KK in this data message DT. The two diagnosis repeaters 3 which are addressed as the bus subscribers T22 and T24 then use this cascading depth identifier KK to identify that this data message DT has already been passed on by one diagnosis repeater 3.

All the diagnosis repeaters 3 thus monitor the message traffic on the bus line 2, and create their topology tables. To do this, each diagnosis repeater 3 sends a measurement [rod] signal MS in an appropriate manner via its measurement circuits 4 and the respective bus segments Bn in order to determine the distance ln to the respective bus subscriber Tn, while the latter responds to the low-priority SRD measurement message from the measurement initiator 6 with a data message DT in the case of a diagnosis repeater 3, or with an RS measurement message in the case of another bus subscriber Tn which is not a diagnosis repeater 3. The totality of the topology tables 7' of all the diagnosis repeaters 3 thus provides the overall network topology of the bus system 1.

The invention has been described in detail with particular reference to preferred embodiments thereof and examples, but it will be understood that variations and modifications can be effected within the spirit and scope of the invention.

The invention claimed is:

1. A method for determining network topology of a bus system having a number of bus subscribers arranged on mutually connected bus segments of a bus line, comprising:
   sending each bus subscriber an initiating measurement message;
   responding to the initiating measurement message by a diagnosis repeater, having a measurement device for reflection measurement and connecting a number of bus segments, with a data message containing a segment identifier;
   responding to the initiating measurement message by other bus subscribers with a response message;
   sending a measurement signal from the diagnosis repeater to a responding bus subscriber;
   reflecting the measurement signal at the responding bus subscriber; and
   determining a distance between the responding bus subscriber and the diagnosis repeater based on a time interval between said sending of the measurement signal and detection of the measurement signal by the diagnosis repeater after said reflecting.

2. The method as claimed in claim 1, further comprising:
incrementing a cascading identifier of a received data message by the diagnosis repeater; and
passing the cascading identifier on a segment-specific basis.

3. The method as claimed in claim 2, further comprising storing the distance to the responding bus subscriber in a topology table associated with the diagnosis repeater.

4. The method as claimed in claim 3, further comprising storing a segment identifier for the responding bus subscriber in the topology table.

5. The method as claimed in claim 4, further comprising storing a status identifier for the responding bus subscriber in the topology table.

6. The method as claimed in 5, further comprising determining a fault location of a line fault between two bus subscribers by the measurement device using the topology table.

7. An apparatus for determining network topology of a bus system having a number of bus subscribers arranged on bus segments of a bus line, comprising
at least one measurement initiator, connected to the bus line, to send a measurement message to the bus subscribers, to which every other bus subscriber responds with a response message; and
diagnosis repeaters, connecting the bus segments to one another, each of said diagnosis repeaters having a segment-specific measurement device for reflection measurement and responding to the measurement message by sending a data message which has a segment identifier, identifying each responding bus subscriber, sending a measurement signal to the responding bus subscriber, and determining a distance to the responding bus subscriber based on a time interval between transmission of the measurement signal and arrival of a reflection signal.

8. The apparatus as claimed in claim 7, wherein each diagnosis repeater further includes a topology table, in which the distance to each bus subscriber is entered, and which is identified by an associated bus segment.

9. The apparatus as claimed in claim 8, wherein addressed bus subscribers in the topology table of each diagnosis repeater are associated with at least one of
a status field for identifying the responding bus subscriber,
a subscriber-specific bus segment field for association of a bus segment connected to said diagnosis repeater,
a distance field for entering the distance to the responding bus subscriber,
a type field for identifying a type of bus subscriber, and
a repeater-specific bus segment field for identifying an adjacent diagnosis repeater on a segment-specific basis.

10. The apparatus as claimed in claim 9,
wherein each diagnosis repeater includes at least two measurement devices for reflection measurement, with each bus segment having only one associated measurement device, and
wherein said at least one measurement initiator includes at least one measurement initiator arranged on at least one bus segment.

* * * * *